United States Patent
Kiyokami et al.

(10) Patent No.: US 10,465,574 B2
(45) Date of Patent: Nov. 5, 2019

(54) HYBRID VEHICLE

(71) Applicant: TOYOTA JIDOSHA KABUSHIKI KAISHA, Toyota-shi, Aichi-ken (JP)

(72) Inventors: Hiroaki Kiyokami, Toyota (JP); Yukinobu Nishikawa, Anjo (JP); Tetsuo Hori, Toyota (JP); Hakuba Okuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 15/672,451

(22) Filed: Aug. 9, 2017

(65) Prior Publication Data
US 2018/0045090 A1 Feb. 15, 2018

(30) Foreign Application Priority Data
Aug. 12, 2016 (JP) ................. 2016-159010

(51) Int. Cl.
| | | |
|---|---|---|
| F01M 5/00 | (2006.01) | |
| F01P 11/08 | (2006.01) | |
| B60W 30/184 | (2012.01) | |
| F16H 57/04 | (2010.01) | |

(52) U.S. Cl.
CPC ........ *F01M 5/005* (2013.01); *B60W 30/1843* (2013.01); *F01P 11/08* (2013.01); *F16H 57/0415* (2013.01); *F16H 57/0441* (2013.01); *F16H 57/0476* (2013.01)

(58) Field of Classification Search
CPC ..... B60K 6/445; B60K 6/365; F16H 57/0434; F16H 57/0441; F16H 57/0476
USPC ........................................ 184/104.3
See application file for complete search history.

(56) References Cited

U.S. PATENT DOCUMENTS

| | | | | |
|---|---|---|---|---|
| 6,135,919 A | * | 10/2000 | Shimakura | .......... F16H 57/0434 184/27.2 |
| 7,832,512 B2 | * | 11/2010 | Watanabe | ................ B60L 50/16 180/65.28 |
| 8,784,249 B2 | * | 7/2014 | Motodohi | ............. F15B 21/001 475/5 |

(Continued)

FOREIGN PATENT DOCUMENTS

| | | |
|---|---|---|
| CN | 105402393 A | 3/2016 |
| DE | 102015113839 A1 | 3/2016 |

(Continued)

*Primary Examiner* — Henry Y Liu
(74) *Attorney, Agent, or Firm* — Oliff PLC (57) ABSTRACT

A hybrid vehicle comprises an engine; a first rotary machine configured to drive the hybrid vehicle; a power transmission system configured to transmit drive force from the engine and the first rotary machine via an output unit to driven wheels; a first oil pump configured to be mechanically rotary-driven along with rotation of the output unit; a second oil pump configured to be rotary-driven by a rotary drive source that is different from the output unit; a first supply passage connected to a discharge side of the first oil pump, and the first supply passage configured to supply lubricating oil at least to the first rotary machine; a second supply passage connected to a discharge side of the second oil pump, and the second supply passage configured to supply lubricating oil at least to the first rotary machine; and an oil cooler provided to the second supply passage.

11 Claims, 9 Drawing Sheets

(56) References Cited

U.S. PATENT DOCUMENTS

| | | | | |
|---|---|---|---|---|
| 2002/0107103 | A1* | 8/2002 | Nakamori | B60K 6/365 |
| | | | | 475/116 |
| 2008/0256943 | A1* | 10/2008 | Shimizu | F16D 25/123 |
| | | | | 60/459 |
| 2010/0320019 | A1* | 12/2010 | Gale | B60K 6/445 |
| | | | | 180/65.27 |
| 2011/0087394 | A1* | 4/2011 | Shimanaka | B60K 6/365 |
| | | | | 701/22 |
| 2016/0052379 | A1* | 2/2016 | Inoue | B60L 3/0023 |
| | | | | 74/661 |
| 2016/0069428 | A1* | 3/2016 | Takayanagi | B60K 6/383 |
| | | | | 60/420 |
| 2016/0176392 | A1* | 6/2016 | Murata | B60K 6/445 |
| | | | | 701/22 |
| 2017/0175612 | A1* | 6/2017 | Tokozakura | F01P 3/18 |
| 2017/0198803 | A1* | 7/2017 | Tokozakura | F16H 57/0413 |
| 2018/0045090 | A1* | 2/2018 | Kiyokami | F01M 5/005 |
| 2018/0334025 | A1* | 11/2018 | Hashimoto | B60K 11/02 |
| 2019/0229582 | A1* | 7/2019 | Ito | H02K 9/19 |

FOREIGN PATENT DOCUMENTS

| | | |
|---|---|---|
| JP | 05-330349 A | 12/1993 |
| JP | 2011-027142 A | 2/2011 |
| JP | 2012-106599 A | 6/2012 |
| JP | 2016-055709 A | 4/2016 |
| JP | 2016-124485 A | 7/2016 |

\* cited by examiner

| TRAVEL MODE | ENGINE 20 | MG1 | MG2 | P1 | P2 |
|---|---|---|---|---|---|
| EV TRAVEL | ROTATION STOP | FREE | POWER RUNNING | ROTATING | STOP |
| HV TRAVEL | OPERATING | RE-GENERATIVE | FREE (POWER RUNNING) | ROTATING | ROTATING |

HYBRID VEHICLE

INCORPORATION BY REFERENCE

The disclosure of Japanese Patent Application No. 2016-159010 filed on Aug. 12, 2016 including the specification, drawings and abstract is incorporated herein by reference in its entirety.

BACKGROUND

1. Technical Field

The technical field relates to a hybrid vehicle, and particularly to improvement of a lubricating apparatus that is applied to a hybrid vehicle, supplies lubricating oil to a rotary machine for travel, and cools the rotary machine for travel.

2. Description of Related Art

There has been proposed a lubricating apparatus applied to (a) a hybrid vehicle including: an engine; a rotary machine for travel; and a power transmission system to transmit a drive force from the engine and rotary machine via an output unit to driven wheels, and the lubricating apparatus includes: (b) a first oil pump mechanically rotary-driven along with rotation of the output unit; (c) a second oil pump rotary-driven by a rotary drive source different from the output unit; (d) a first supply passage connected to a discharge side of the first oil pump so as to supply lubricating oil at least to the rotary machine for travel; and (e) a second supply passage connected to a discharge side of the second oil pump so as to supply lubricating oil at least to the rotary machine for travel. An apparatus described in Japanese Patent Application Publication No. 2012-106599 is one example of the above lubricating apparatus, and the second oil pump is configured to be rotary-driven by the engine. Note that "lubrication or lubricating" in the present specification includes not only the case of preventing friction and abrasion, but also the case of supplying the lubricating oil to a rotary machine or the like so as to cool the rotary machine, for example.

SUMMARY

Even in the lubricating apparatus, there may be a possibility that a sufficient cooling performance cannot always be secured, and thus a temperature of the rotary machine for travel becomes increased during a high load travel, for example, so that the output is restricted. If an oil cooler is provided to the supply passage of the lubricating oil, cooling performance is improved, but the temperature of the lubricating oil becomes difficult to be increased at a low temperature time. Generally, the lubricating oil has a higher viscosity at the low temperature time, and thus a load of the oil pump and a stirring resistance at lubricated parts become greater, so that mechanical loss due to them causes deterioration of fuel efficiency.

An object of the disclosure is to properly cool a rotary machine for travel without hindering increase in temperature of lubricating oil at a low temperature time or the like.

A hybrid vehicle according to a first aspect, includes: (a) an engine; (b) a first rotary machine configured to drive the hybrid vehicle; (c) a power transmission system configured to transmit drive force from the engine and the first rotary machine via an output unit to driven wheels, (d) a first oil pump configured to be mechanically rotary-driven along with rotation of the output unit; (e) a second oil pump configured to be rotary-driven by a rotary drive source that is different from the output unit; (f) a first supply passage connected to a discharge side of the first oil pump, and the first supply passage supplying lubricating oil at least to the first rotary machine; and (g) a second supply passage connected to a discharge side of the second oil pump, and the second supply passage supplying lubricating oil at least to the first rotary machine; and (h) an oil cooler provided to only the second supply passage of the first supply passage and the second supply passage.

According to a second aspect, in the hybrid vehicle in the first aspect, (a) the hybrid vehicle may travel in an EV (electric vehicle) travel mode for the hybrid vehicle to travel by the first rotary machine in a state in which the engine is stopped, and an HV (hybrid vehicle) travel mode for the engine to operate on a higher load side than that of the EV travel mode, and (b) the second oil pump may be an oil pump mechanically rotary-driven along with rotation of the engine.

According to a third aspect, in the hybrid vehicle in the first aspect, the first supply passage and the second supply passage may be configured independently of each other.

According to a fourth aspect, in the hybrid vehicle in the first aspect, (a) the power transmission system may include: a second rotary machine for differential control; and a differential mechanism that includes a first rotary element connected to the engine, a second rotary element connected to the second rotary machine for differential control, and a third rotary element connected to the output unit, and (b) the second supply passage may be configured to supply the lubricating oil having passed through the oil cooler to also the second rotary machine for differential control.

According to a fifth aspect, in the hybrid vehicle in the first aspect, the first supply passage may be configured to supply lubricating oil to also the differential mechanism.

In such a lubricating apparatus for the hybrid vehicle, of the first supply passage and the second supply passage, only the second supply passage is provided with the oil cooler, and the lubricating oil discharged from the second oil pump is cooled by the oil cooler, and thereafter is supplied to the first rotary machine; and on the other hand, the lubricating oil discharged from the first oil pump is supplied via the first supply passage to the first rotary machine without being cooled by the oil cooler. Here, during the vehicle traveling, since the first oil pump is rotary-driven in accordance with the vehicle velocity to discharge the lubricating oil, the lubricating oil discharged from the first oil pump is supplied to the first rotary machine so as to cool the first rotary machine, and at the same time, the lubricating oil is rapidly warmed through thermal transpiration from the first rotary machine to thereby suppress mechanical loss resulting from high viscosity of the lubricating oil at a low temperature time.

In the meantime, the second oil pump is operated by, for example, the engine or an electric motor for a pump as the rotary drive source thereof, and the lubricating oil discharged from the second oil pump is supplied via the oil cooler to the first rotary machine. Generally, during the high load travel, the temperature of the first rotary machine becomes increased, but in this case, the lubricating oil cooled by the oil cooler is supplied to the first rotary machine so as to properly suppress increase in temperature of the first rotary machine.

The second aspect is the case in which the second oil pump is an oil pump mechanically rotary-driven along with the rotation of the engine; and during the traveling in the EV travel mode at a low load time, increase in temperature of the first rotary machine is properly suppressed by the lubricating oil discharged from the first oil pump, and the lubricating oil is rapidly warmed through thermal transpiration from the first rotary machine to thereby suppress mechanical loss resulting from high viscosity of the lubricating oil at a low temperature time. During the traveling in the HV travel mode at a high load time, the lubricating oil discharged from the second oil pump is supplied to the first rotary machine via the oil cooler to thus properly suppress increase in temperature of the first rotary machine that is brought to operate with a high load. In addition, an oil pump that is mechanically rotary-driven along with rotation of the engine is used as the second oil pump; thus compared with the case of employing an electric oil pump rotary-driven by an electric motor for a pump, no controlling is required, and it is advantageous in cost, or the like.

In the third aspect, the first supply passage and the second supply passage are configured independently of each other, thus eliminating necessity of a switching valve or the like, and simplifying the structure.

The fourth aspect is the case in which the power transmission system has a second rotary machine for differential control, and the second rotary machine for differential control is regenerative-controlled with a torque in accordance with a requested drive force when the engine torque is outputted, and thus the second rotary machine for differential control might have a high temperature due to a great load (regenerative torque) at a high load time, but the lubricating oil having passed through the oil cooler is supplied to the second rotary machine for differential control via the second supply passage; therefore, increase in temperature of the second rotary machine for differential control is properly suppressed.

In the fifth aspect, since the first supply passage is configured to supply lubricating oil to also the differential mechanism, it is possible to prevent seizing of rotary elements such as planetary pinions caused to co-rotate in accordance with the vehicle velocity.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The present disclosure is preferably applied to a hybrid vehicle including an electric differential unit, but the present disclosure can also be applied to various hybrid vehicles including rotary machines for travel other than engines as drive sources for travel. As the rotary machine for travel, it is proper to use a motor generator that can alternatively use functions of an electric motor and an electric power generator, for example, but an electric motor may also be used. It is also proper to use a motor generator as a rotary machine for differential control of an electric differential unit, but an electric power generator may also be used. By setting a torque of the rotary machine for differential control to be zero, a differential mechanism is allowed to differentially rotate, which prevents the engine from co-rotating.

An output unit of the power transmission system that drives a first oil pump is a differential device that distributes a drive force transmitted from the engine via a gear mechanism and others to right and left driven wheels, for example. As the power transmission system, a horizontal type transaxle such as an FF (front engine-front drive) transaxle having multiple shafts arranged in the vehicle width direction may preferably be used, but an FR type or a four-wheel drive type power transmission system may also be used.

A first supply passage and a second supply passage are configured so as to supply and lubricate each part (e.g. a gear, a bearing, etc.) of the power transmission system in addition to the rotary machine for travel with the lubricating oil. As a second oil pump, an oil pump mechanically rotary-driven by an engine is preferably used, but an electric oil pump rotary-driven by an electric motor for a pump may also be employed. An oil cooler provided to the second supply passage is configured to cool the lubricating oil through heat exchange by air cooling, for example, but an oil cooler to cool the lubricating oil with cooling water may also be used.

The present disclosure is preferably applied to a hybrid vehicle including an EV travel mode and an HV travel mode, but may also be applied to a hybrid vehicle that travels only in the HV travel mode in which the engine is brought to primarily operate and the rotary machine for travel to secondarily operate, for example. The first supply passage and the second supply passage may be configured independently of each other, or may be connected to each other so as to supply the lubricating oil of the supply passage on the high-pressure side to the rotary machine for travel. In addition, it may be configured that the first supply passage and the second supply passage are connected to each other, and a switching mechanism is so provided as to mechanically switch the oil passage depending on the oil pressures of both supply passages in such a manner that the lubricating oil in the supply passage on the high pressure side is supplied to the rotary machine for travel. This switching mechanism may be configured by using a shuttle valve in which a spool moves depending on the oil pressures of both supply passages, or may be configured by using a pair of check valves. The oil passages may also be switched by using an electromagnetic switching valve.

It is possible to supply the lubricating oil from the first supply passage to the differential mechanism of the electric differential unit, and also possible to supply the lubricating oil from the second supply passage so as to lubricate the differential mechanism. The lubricating oil may be supplied from both the first supply passage and the second supply passage to lubricate the differential mechanism. As the differential mechanism of the electric differential unit, a single planetary gear unit of a single-pinion type or a double-pinion type may preferably be used. This planetary gear unit includes three rotary elements of a sun gear, a carrier, and a ring gear, and the engine is connected to one of the three rotary elements that has an intermediate rotational speed in a differential state (the carrier of the single-pinion type planetary gear unit or the ring gear of the double-pinion type planetary gear unit), for example, and the rotary machine for differential control and the output unit are respectively connected to the other two rotary elements; however, the output unit may be connected to the intermediate rotary element.

The first oil pump and the second oil pump may be provided on the intake side thereof with a common intake port to which respective intake oil passages of both oil pumps are connected to each other; but these oil pumps may also be independently provided with different intake ports via different intake oil passages. In the latter case, an arrangement of the intake ports and meshes may be separately set depending on the discharge mount and the supply passages of the respective oil pumps. In addition, it is possible to separately provide the intake ports to different oil reservoirs where a flow of the lubricating oil is restricted by a partitioning wall or the like, so that it is possible to separately set the discharge amount (intake amount) of each oil pump or the like depending on the amount of return oil to each oil reservoir. A flow restricting part such as the partitioning wall may be configured such that oil levels of the multiple oil reserves are different from each other even in a static state in which fluctuation of oil levels becomes stopped; and it may also be configured that the lubricating oil having returned to the oil reservoir flows over the partitioning wall, or the lubricating oil flows via an orifice provided to the partitioning wall, thereby substantially evening the oil levels of the multiple oil reservoirs.

Hereinafter, embodiments will be described in detail with reference to drawings. Note that in the following embodiments, the drawings are appropriately simplified or deformed for convenience of explanation, and the dimension ratios, shapes, etc., of respective components therein are not always correctly depicted.

Figure 1:
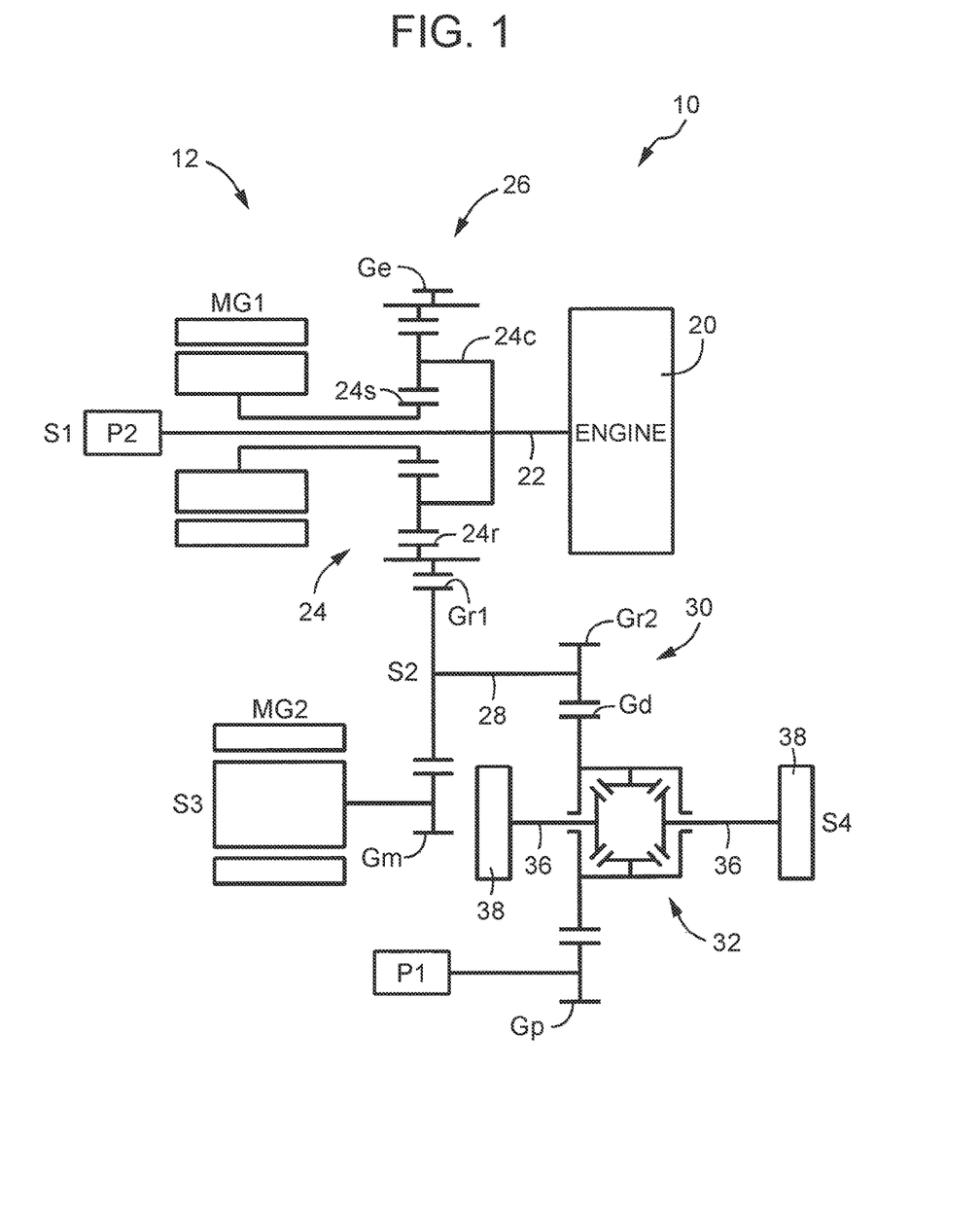
FIG. 1 is an outline view showing a power transmission system of a hybrid vehicle, in a developed state, to which the present disclosure is preferably applied.
Figure 2:
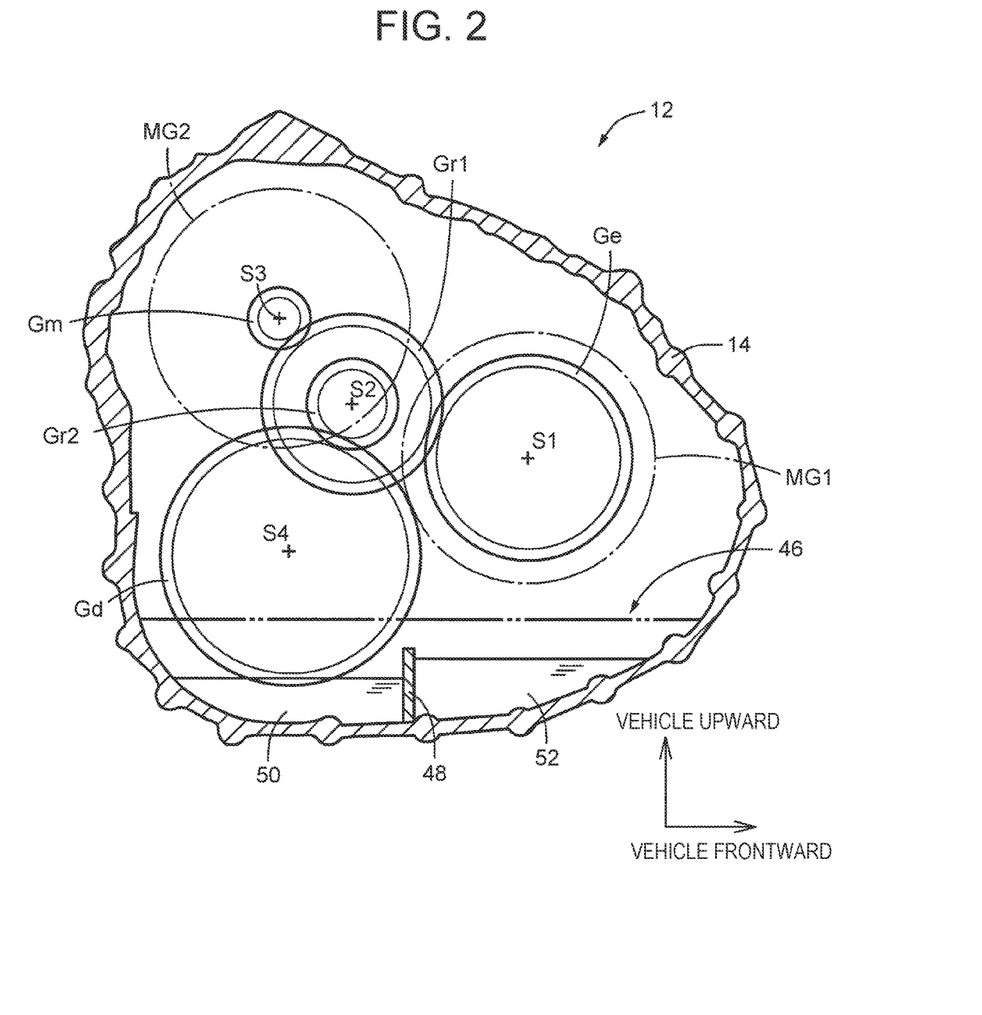
FIG. 2 is a sectional view explaining a positional relation between multiple shafts of the power transmission system of the hybrid vehicle of FIG. 1.

FIG. 1 is an outline view explaining a power transmission system 12 of a hybrid vehicle 10 to which the present disclosure is preferably applied, and is a developed view showing, in a developed manner, that multiple shafts composing the power transmission system 12 are located within a common plane, and FIG. 2 is a sectional view showing a positional relation of these multiple shafts. The power transmission system 12 is a horizontal type transaxle for a hybrid vehicle such as an FF vehicle having multiple shafts arranged along the vehicle width direction, and is housed in a transaxle case 14 shown in FIG. 2.

The power transmission system 12 includes a first axial line S1 to a fourth axial line S4 that are substantially parallel to the vehicle-width direction, and an input shaft 22 connected to an engine 20 is arranged on the first axial line S1, and a single-pinion type planetary gear unit 24 and a first motor generator MG1 are concentrically arranged to the first axial line S1. The planetary gear unit 24 and the first motor generator MG1 function as an electric differential unit 26, and the input shaft 22 is connected to a carrier 24c of the planetary gear unit 24 that is a differential mechanism, the first motor generator MG1 is connected to a sun gear 24s, and an engine output gear Ge is provided to a ring gear 24r. The carrier 24c may correspond to a first rotary element, the sun gear 24s may correspond to a second rotary element, the ring gear 24r may correspond to a third rotary element, and the first motor generator MG1 may correspond to a second rotary machine for differential control. The first motor generator MG1 is alternatively used as an electric motor or an electric power generator, and by continuously controlling the rotational speed of the sun gear 24s through regenerative control in which the first motor generator MG1 functions as the electric power generator, the rotational speed of the engine 20 is continuously changed, and is then outputted from the engine output gear Ge. The torque of the first motor generator MG1 is set to be zero so as to bring the sun gear 24s to idle, and thereby the engine 20 is prevented from co-rotating. The engine 20 is an internal combustion engine that generates a motive power by combustion of fuel.

There is provided on the second axial line S2 a reduction gear unit 30 including a large reduction gear Gr1 and a small reduction gear Gr2 that are provided at both ends of a shaft 28, and the large reduction gear Gr1 meshes with the engine output gear Ge. The large reduction gear Gr1 also meshes with a motor output gear Gm of a second motor generator MG2 disposed on the third axial line S3. The second motor generator MG2 is alternatively used as the electric motor or the electric power generator, and is used as a drive source for travel of the hybrid vehicle 10 by being subjected to power running control so as to function as an electric motor. This second motor generator MG2 may correspond to a first rotary machine configured to drive the hybrid vehicle.

The small reduction gear Gr2 meshes with a differential ring gear Gd of a differential unit 32 arranged on the fourth axial line S4, each of the drive force from the engine 20 and the drive force from the second motor generator MG2 is transmitted via the differential unit 32 and is split into the right and left drive shafts 36, and is then transmitted to the right and left driven wheels 38. This differential unit 32 may correspond to an output unit, and the differential ring gear Gd may correspond to an input gear. A gear mechanism is composed of the engine output gear Ge, the large reduction gear Gr1, the small reduction gear Gr2, the differential ring gear Gd, and others. As apparent from FIG. 2, among the first axial line S1 to the fourth axial line S4, the fourth axial line S4 is set at a lowermost position in the vehicle vertical direction, and the second axial line S2 and the third axial line S3 are set at more upward positions than the fourth axial line S4, and the first axial line S1 is set at a more obliquely upward position in the vehicle frontward direction than the fourth axial line S4.

Figure 3:
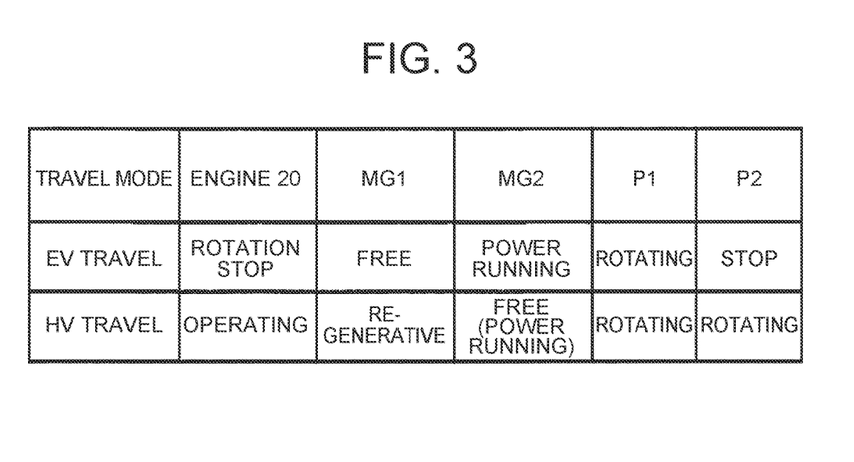
FIG. 3 is a view explaining two types of travel modes executable in the hybrid vehicle of FIG. 1.
Figure 4:
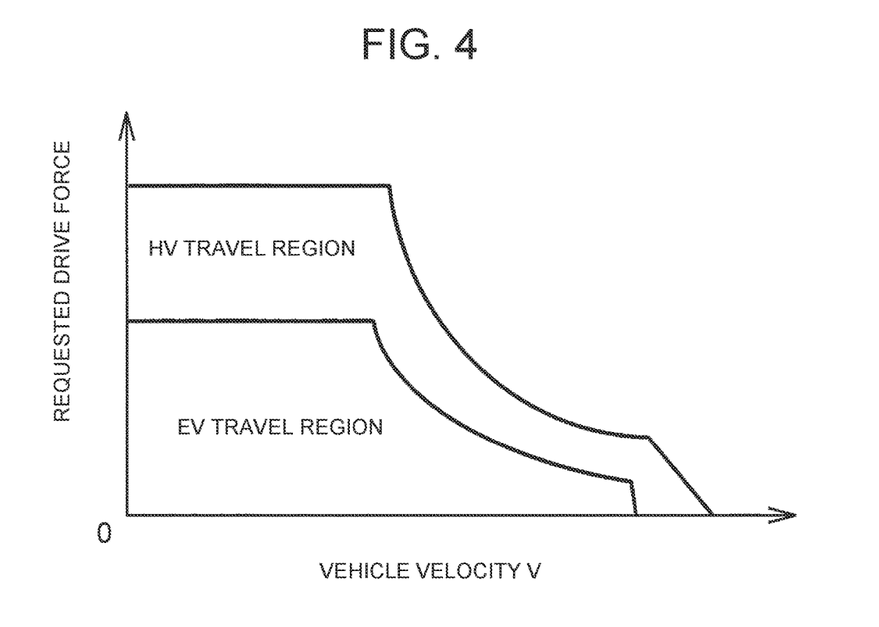
FIG. 4 is a map explaining one example of travel regions of the two types of travel modes of FIG. 3.

In such hybrid vehicle 10, the EV travel mode and the HV travel mode shown in FIG. 3 are executable, and switching is carried out between the EV travel mode and the HV travel mode in accordance with a mode switching map in which a requested drive force (accelerator operation amount) and a vehicle velocity V are defined as parameters, as shown in FIG. 4, for example. In the EV travel mode, in a state in which the rotation of the engine 20 is stopped, the vehicle travels by subjecting the second motor generator MG2 to the power running control so as to use the second motor generator MG2 as the drive source, and the EV travel mode is selected in a region of a low requested drive force, that is, a low load. The rotation of the engine 20 is substantially stopped even during the vehicle traveling time, by stopping fuel supply to the engine 20, and setting the torque of the first motor generator MG1 to be zero so as to bring the sun gear 24s of the planetary gear unit 24 to freely rotate. In the HV travel mode, the vehicle travels using the engine 20 as the drive source by regenerative-controlling the first motor generator MG1, and this mode is selected in a region of a higher requested drive force (high load) than the EV travel mode. In the HV travel mode, the second motor generator MG2 is used as the drive source by being secondarily subjected to the power running control at an acceleration time or the like, or is used as the drive source by being subjected to the power running control all the time.

Instead of the HV travel mode, or in addition to the HV travel mode, there may be provided an engine travel mode using only the engine 20 as the drive source all the time. The power transmission system 12 of the hybrid vehicle 10 is merely an example, and various manners may be employed as follows: for example, the double-pinion type planetary gear unit may be used as the planetary gear unit 24, or the power transmission system 12 may be composed by using multiple planetary gear units; or alternatively, the second motor generator MG2 may be concentrically disposed to the first axial line S1; or a mechanical transmission unit may be employed instead of the electric differential unit 26, or the like.

Figure 5:
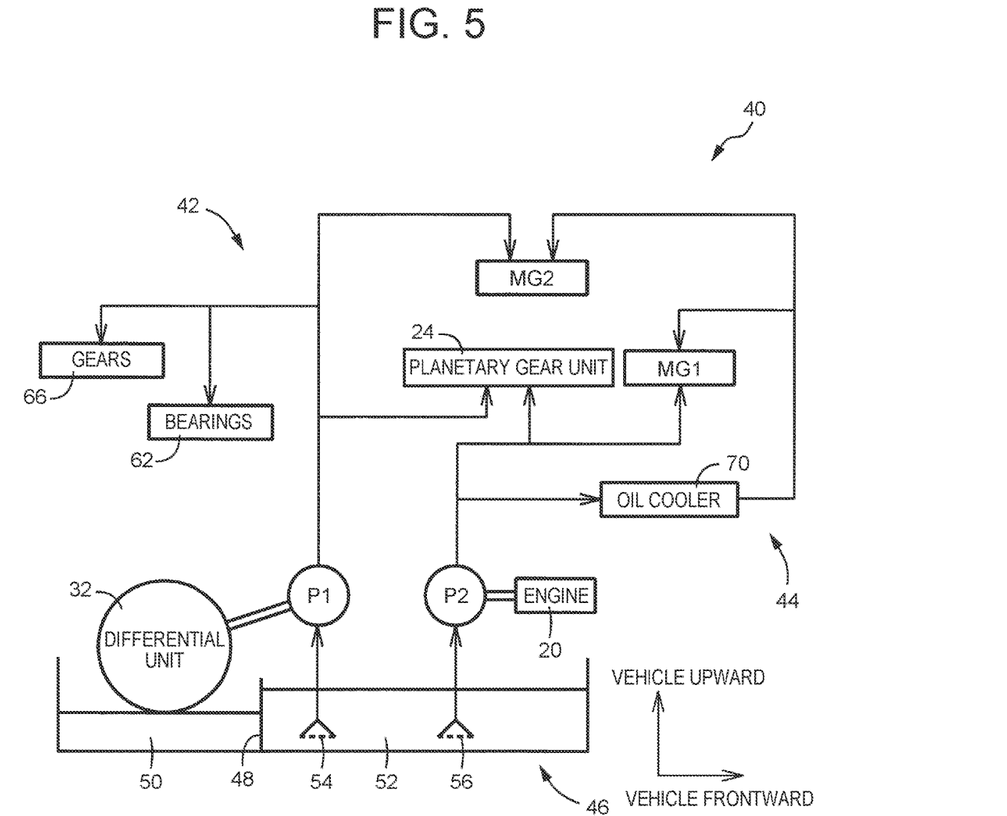
FIG. 5 is an oil-hydraulic circuit diagram explaining a lubricating apparatus included in the hybrid vehicle of FIG. 1.

In the meantime, the hybrid vehicle 10 of the present embodiment includes a lubricating apparatus 40 shown in FIG. 5. The lubricating apparatus 40 includes a first oil pump P1 and a second oil pump P2 as an intake unit, and they are respectively connected to a first supply passage 42 and a second supply passage 44 that are separately independent from each other so as to share the lubrication to respective components of the power transmission system 12. As shown in FIG. 1, the first oil pump P1 is a mechanical type oil pump mechanically rotary-driven via a pump drive gear Gp meshing with the differential ring gear Gd, and the second oil pump P2 is a mechanical type oil pump connected to the input shaft 22 and mechanically rotary-driven by the engine 20. The first oil pump P1 may be configured to be rotary-driven by bringing the pump drive gear Gp to mesh with the large reduction gear Gr1 or the small reduction gear Gr2 or the like that are rotated together with the differential ring gear Gd. The second oil pump P2 is an oil pump that is rotary-driven by a rotary drive source different from an output unit (the differential unit 32), and is an oil pump rotary-driven by the engine 20 in the present embodiment, but there may be employed an electric oil pump rotary-driven by an electric motor for driving a pump.

The first oil pump P1 and the second oil pump P2 suck the lubricating oil from an oil reservoir 46 provided to a bottom of the transaxle case 14, and output the lubricating of to the supply passages 42, 44. The oil reservoir 46 is composed by the transaxle case 14 itself, and has a first reservoir 50 and a second reservoir 52 that are formed individually in the vehicle longitudinal direction by a partitioning wall 48. The first oil reservoir 50 located at the rear side of the vehicle is a part located below the differential unit 32 that is the output unit, and the second reservoir 52 located at the front side of the vehicle is a part located below the first axial line S1 on which the planetary gear unit 24 and others are arranged; and an intake port 54 of the first oil pump P1 and an intake port 56 of the second oil pump P2 are both disposed in the second reservoir 52. The intake port 54 and the intake port 56 are respectively connected via different intake oil passages that are independently provided to the oil pumps P1 and P2.

The partitioning wall 48 functions as the flow restricting part that allows the lubricating oil to flow between the first oil reservoir 50 and the second reservoir 52 and also restricts that the oil levels become equal to each other. This means that the operations of the first and second oil pumps P1, P2 are both stopped when the vehicle stops, and in a static state in which fluctuation of oil levels is stopped, the lubricating oil having been supplied to the respective components of the power transmission system 12 flows down and returns to the oil reservoir 46, so that the oil level goes up over the partitioning wall 48 as indicated by a two-dot chain line in FIG. 2, and thus the oil levels of both oil reservoirs 50, 52 become equal to each other. On the other hand, while the vehicle travels or the oil pumps P1, P2 are operated, the flow restriction by the partitioning wall 48 causes the respective oil levels of both oil reservoirs 50, 52 to change individually. Specifically, in the static state in which the oil levels of both oil reservoirs 50, 52 become equal to each other, the amount of the lubricating oil is defined such that a part of the differential unit 32 is soaked in the lubricating oil. In this manner, when the part of the differential unit 32 is soaked in the lubricating oil, the lubricating oil is scooped up by the differential ring gear Gd and others when the vehicle starts, and thereby the lubricating oil is splashed to the respective components of the power transmission system 12; thus it is possible to secure a lubricating condition even at the vehicle starting time when it is difficult to supply a sufficient amount of lubricating oil by the first oil pump P1. When the vehicle starts, the engine 20 is normally stopped rotating in the EV travel mode, so that the operation of the second oil pump P2 is also stopped operating.

On the other hand, when the oil pumps P1, P2 are operated, or when the vehicle travels, the oil level becomes lower due to the scoop up by the differential ring gear Gd or the like rotating in accordance with the vehicle velocity V and the intake by the oil pumps P1, P2, so that the oil level becomes lower than the partitioning wall 48. Then, in the first oil reservoir 50, the oil level is determined based on the balance (proportion) between the scoop-up by the differential ring gear Gd or the like and the amount of the return oil, and in the second reservoir 52, the oil level is determined based on the balance between the intake by the oil pumps P1, P2 and the amount of the return oil. In the present embodiment, the amount of the lubricating oil, the volume of the first oil reservoir 50, that is, the position of the partitioning wall 48, the shape of the partitioning wall 48, the intake amount (discharge amount) of the oil pumps P1, P2, and others are defined so that the oil level of the first oil reservoir 50 is preferentially lowered to be located in the vicinity of the lower end of the differential ring gear Gd as indicated by a solid line shown in FIG. 2. In this manner, when the oil level of the first oil reservoir 50 is preferentially lowered, agitation of the lubricating oil by the differential ring gear Gd or the like is suppressed, and thus energy loss is reduced to improve the fuel efficiency. The second reservoir 52 in which the intake ports 54, 56 are disposed has a higher oil level than that in the first oil reservoir 50; thus, compared to the case of disposing the intake ports 54, 56 in the first oil reservoir 50, intake of the air, that is, so-called air sucking by the oil pumps P1, P2 due to the intake ports 54, 56 exposed on the oil surface is suppressed, regardless of change in posture of the vehicle due to a slope of the road surface, steering, or the like, or deviation of the lubricating oil (fluctuation of oil levels) due to acceleration and deceleration, or the like, to thus suppress the air sucking and properly suck the lubricating oil. This means that, while the oil reservoir 46 is divided by the partitioning wall 48 so as to secure a sufficient amount of lubricating oil on the second reservoir 52 side, the oil level in the first oil reservoir 50 where the differential unit 32 is disposed is preferentially lowered, thereby reducing energy loss by suppressing agitation of the lubricating oil by the differential ring gear Gd or the like.

Note that in the present embodiment, the intake ports 54, 56 are both disposed in the second reservoir 52, but, for example, the intake port 54 of the first oil pump P1 may be disposed in the first oil reservoir 50. In this case, the oil level of the first oil reservoir 50 can be lowered to a position where the lubricating oil does not reach the differential ring gear Gd. The first supply passage 42 may be provided with an oil storage, taking the air sucking due to the lowering of the oil level into consideration. In addition, the partitioning wall 48 may be set to be higher than the oil surface in the static state (two-dot chain line of FIG. 2), and the partitioning wall 48 may be provided with an orifice or the like that allows a flow of the lubricating oil between both oil reservoirs 50, 52 in a state of having a predetermined flow resistance. If it is unnecessary to consider the agitation of the lubricating oil by the differential ring gear Gd or the like, the partitioning wall 48 may be omitted.

The first supply passage 42 is connected to the discharge side of the first oil pump P1 so as to supply the lubricating oil to the respective components of the power transmission system 12. Specifically, it is configured to supply the lubricating oil to bearings 62 and gears 66 (e.g. Ge, Gr1, Gr2, Gd, Gm, Gp, etc.) that are respective components of the power transmission system 12, and the planetary gear unit 24 so as to lubricate them, and also supply the lubricating oil to the second motor generator MG2. The first oil pump P1 is connected to the differential unit 32 so as to be rotary-driven, and thus the first oil pump P1 is also rotary-driven even in the EV travel mode in which the engine 20 is stopped, as shown in FIG. 3; therefore, it is possible to suck the lubricating oil at an intake amount in accordance with the vehicle velocity V, and supply the lubricating oil to these components. The differential unit 32 is lubricated by the scoop-up of the lubricating oil by the differential ring gear Gd, for example, but can also be lubricated by being supplied with the lubricating oil from the first supply passage 42. In addition, if there is a possibility that the first oil pump P1 causes air sucking, or the like, an oil storage may be provided if necessary for the sake of a stable lubricating oil supply.

The second supply passage 44 connected to the discharge side of the second oil pump P2 supplies the lubricating oil to the input shaft 22, the planetary gear unit 24, and the first motor generator MG1 that are located above the second reservoir 52, and cools these components. Further, the second supply passage 44 is provided with an oil cooler 70 so as to cool the lubricating oil, and supply the lubricating oil to the first motor generator MG1 and the second motor generator MG2 to thereby cool these components and prevent overheating thereof. The oil cooler 70 cools the lubricating oil through heat-exchange by air-cooling, for example. The engine 20 that rotary-drives the second oil pump P2 can also drive the second oil pump P2 even when the vehicle is stopped, and thus it is possible to suck the lubricating oil by an amount of the lubricating oil not relying on the vehicle velocity V and even when the vehicle is stopped and supply the lubricating oil to lubricated parts; however, in the EV travel mode, as shown in FIG. 3, the operation of the second oil pump P2 is stopped along with the rotation stop of the engine 20.

In this manner, in the lubricating apparatus 40 of the hybrid vehicle 10 of the present embodiment, the lubricating oil is supplied to the second motor generator MG2 from both the first supply passage 42 connected to the first oil pump P1 and the second supply passage 44 connected to the second oil pump P2, and only the second supply passage 44 is provided with the oil cooler 70, so that the lubricating oil discharged from the second oil pump P2 is cooled by the oil cooler 70, and thereafter is supplied to the second motor generator MG2. To the contrary, the lubricating oil discharged from the first oil pump P1 is supplied to the second motor generator MG2 without being cooled by the oil cooler. Here, during the vehicle traveling, since the first oil pump P1 is rotary-driven in accordance with the vehicle velocity V so as to discharge the lubricating oil, the lubricating oil discharged from the first oil pump P1 is supplied to the second motor generator MG2 so as to cool the second motor generator MG2 even in the EV travel mode in which the vehicle travels by the second motor generator MG2 with the engine 20 stopped; and at the same time, the lubricating oil is rapidly warmed through thermal transpiration from the second motor generator MG2 to thereby suppress mechanical loss resulting from high viscosity of the lubricating oil at a low temperature time. Since the EV travel mode is selected at a low load time, increase in temperature of the second motor generator MG2 becomes reduced, and thus it is possible to suppress increase in temperature of the second motor generator MG2 even without using the oil cooler.

In the meantime, the second oil pump P2 is operated by the engine 20 as the rotary drive source thereof, and the second oil pump P2 is operated in the HV travel mode in which the vehicle travels with the engine 20 running, to thereby supply the lubricating oil discharged from the second oil pump P2 via the oil cooler 70 to the second motor generator MG2. The HV travel mode is selected at a higher load time than that in the EV travel mode, and thus the load of the second motor generator MG2 for travel frequently becomes greater, but the lubricating oil cooled by the oil cooler 70 is supplied to the second motor generator MG2 to thus properly suppress increase in temperature of the second motor generator MG2. Since the second oil pump P2 is operated only at a relatively high load time, and the lubricating oil is supplied only from the oil pump P1 to the second motor generator MG2 at a low load time; therefore, there can properly be obtained such an effect that the lubricating oil is rapidly warmed by the second motor generator MG2 at the vehicle starting time or the like.

In addition, as the second oil pump P2, the oil pump is operated by the engine 20 as the rotary drive source thereof; therefore, no complicated control is required and advantages in cost and the like are obtained, compared with the case of employing an electric oil pump rotary-driven by an electric motor for a pump.

Since the first supply passage 42 and the second supply passage 44 are configured independently of each other, thus eliminating necessity of providing a switching valve or the like, and simplifying the structure.

Since the first motor generator MG1 for differential control of the electric differential unit 26 is regenerative-controlled with a torque in accordance with a requested drive force when an engine torque is outputted in the HV travel mode, the first motor generator MG1 might have a high temperature due to a great load (regenerative torque) at the high load time, but the lubricating oil cooled by the oil cooler 70 is also supplied to the first motor generator MG1 via the second supply passage 44 to thus properly suppress increase in temperature of the first motor generator MG1.

In addition, the first supply passage 42 is configured to supply the lubricating oil to also the planetary gear unit 24 of the electric differential unit 26, and the planetary gear unit 24 is lubricated by the lubricating oil supplied from the first supply passage 42 even in the EV travel mode in which the engine 20 is stopped, to thereby prevent seizing of rotary elements such as planetary pinions that are caused to co-rotate in accordance with the vehicle velocity V. Through this, together with the supply of the lubricating oil in the first supply passage 42 to the second motor generator MG2 for travel, it is possible to increase the upper limit of the vehicle velocity in the EV travel mode region, and thus further improvement of fuel efficiency is attained.

Moreover, since the oil pumps P1, P2 are independently provided with the different intake ports 54, 56 via the different intake oil passages, it is possible to individually set the arrangements of the intake ports 54, 56 and a mesh depending on the discharge amount of each of the oil pumps P1, P2 and the positions of the lubricated parts by the supply passages 42, 44. For example, a strainer of the intake port 56 of the second oil pump P2 for supplying the lubricating oil through the oil cooler 70 preferably has a fine mesh.

The oil reservoir 46 has first oil reservoir 50 and the second reservoir 52 which are formed individually by the partitioning wall 48; and while the amount of the lubricating oil that does not hinder the intake performance of the oil pumps P1, P2 that suck the lubricating oil from the second reservoir 52 is secured, the lubricating oil in the first oil reservoir 50 is scooped up by the differential ring gear Gd to thereby preferentially lower the oil level of the first oil reservoir 50, and thus reduce energy loss due to agitation by the differential ring gear Gd or the like.

In the meantime, in the static state in which the operations of the first oil pump P1 and the second oil pump P2 are stopped, that is, at the vehicle stopping time, the oil level goes up over the partitioning wall 48 due to the return of the lubricating oil from the lubricated parts, so that the oil level of the first oil reservoir 50 becomes the same as that of the second reservoir 52, and the differential unit 32 is partially soaked in the lubricating oil in the first oil reservoir 50. Accordingly, the lubricating oil is scooped up by the differential ring gear Gd and others at the vehicle starting time, and thereby the lubricating oil is splashed to the respective components of the power transmission system 12 to thus secure the lubricating condition at the vehicle starting time when it is difficult to supply a sufficient amount of lubricating oil by the first oil pump P1.

Next, other embodiments will be described. In the following embodiments, the same reference numerals are used for components substantially common to those in the above embodiment, and detailed description thereof will be omitted.

Figure 6:
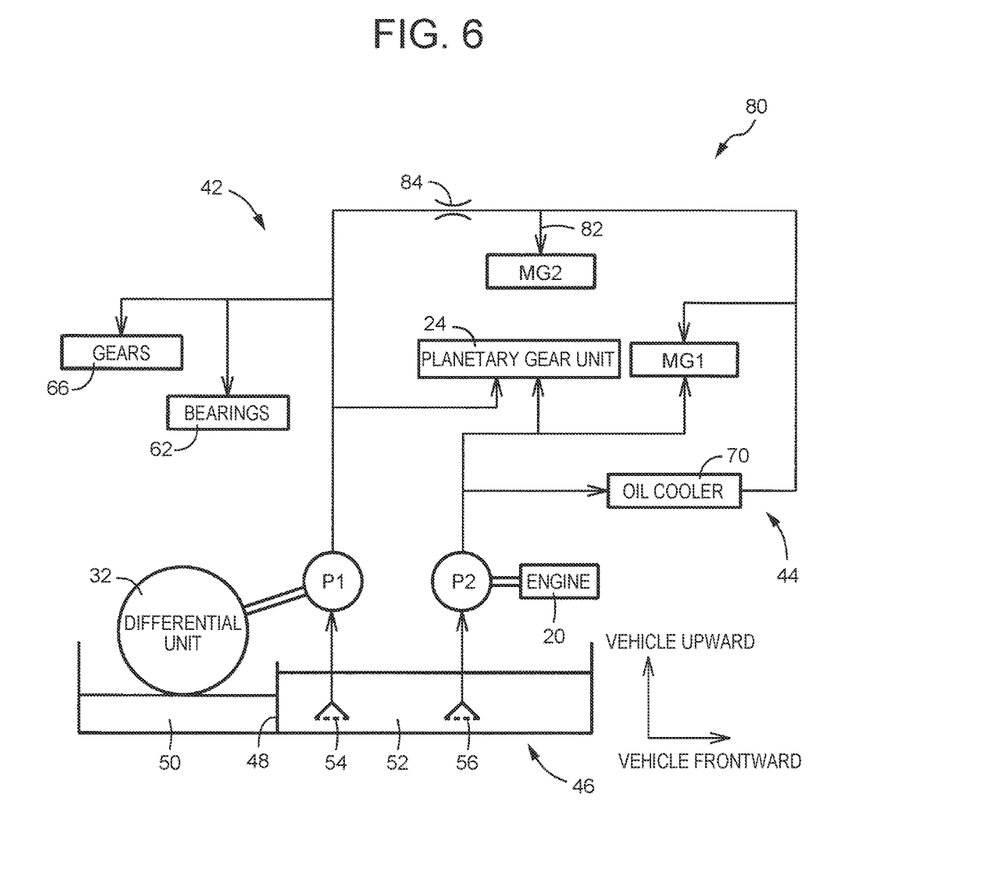
FIG. 6 is an oil-hydraulic circuit diagram explaining another example of the lubricating apparatus preferably provided to the hybrid vehicle of FIG. 1.

Compared with the lubricating apparatus 40, a lubricating apparatus 80 of FIG. 6 is provided with the first supply passage 42 and the second supply passage 44 that are connected to each other, and the lubricating oil in the passage on the high pressure side is supplied via a common MG2 oil supply passage 82 to the second motor generator MG2. The first supply passage 42 is provided with a throttle 84 at a position immediately before the MG2 oil supply passage 82; and when the first oil pump P1 and the second oil pump P2 are together operated in the HV travel mode or the like, it is suppressed that the lubricating oil of the second supply passage 44 on the high pressure side leaks toward the first supply passage 42 side, and it is configured that the lubricating oil is properly supplied from the MG2 oil supply passage 82 to the second motor generator MG2. When only the oil pump P1 is operated in the EV travel mode or the like, a predetermined amount of the lubricating oil is supplied via the throttle 84 to the second motor generator MG2. The degree of the throttle 84 is defined such that a necessary amount of the lubricating oil is supplied from the first supply passage 42 to the second motor generator MG2 in the EV travel mode, and the lubricating oil in the second supply passage 44 is supplied to the second motor generator MG2 by the difference in oil pressure in the HV travel mode. The intake amount (discharge amount) of the oil pumps P1, P2 is defined such that when the oil pumps P1, P2 are both rotary-driven in the HV travel mode, the oil pressure of the second supply passage 44 on the second oil pump P2 side, more strictly, the oil pressure of the lubricating oil after the lubricating oil passes through the oil cooler 70 is higher than the oil pressure of the first supply passage 42.

Also in the present embodiment, in the EV travel mode with a low load, the lubricating oil is supplied to the second motor generator MG2 only from the first oil pump P1 to thereby rapidly warm the lubricating oil by the second motor generator MG2 at the vehicle starting time or the like. On the other hand, in the HV travel mode with a high load, the lubricating oil supplied from the second oil pump P2 via the oil cooler 70 is supplied to the second motor generator MG2 to thereby properly suppress increase in temperature of the second motor generator MG2, or the like; therefore, the same effect as that of the above embodiment can be obtained. In particular, in the HV travel mode, because of the difference in pressure, only the lubricating oil supplied from the second oil pump P2 via the oil cooler 70 is supplied to the second motor generator MG2 from the MG2 oil supply passage 82, to thus more effectively suppress increase in temperature of the second motor generator MG2.

Figure 7:
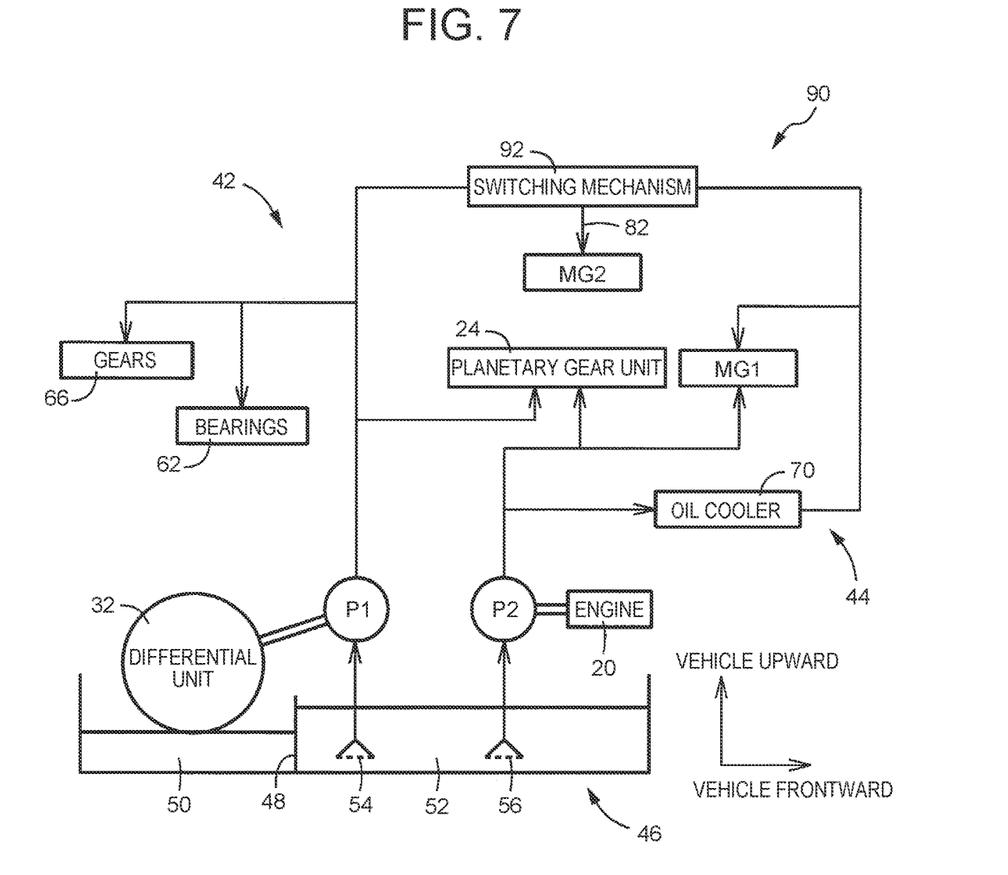
FIG. 7 is an oil-hydraulic circuit diagram explaining further another example of the lubricating apparatus preferably provided to the hybrid vehicle of FIG. 1.
Figure 8:
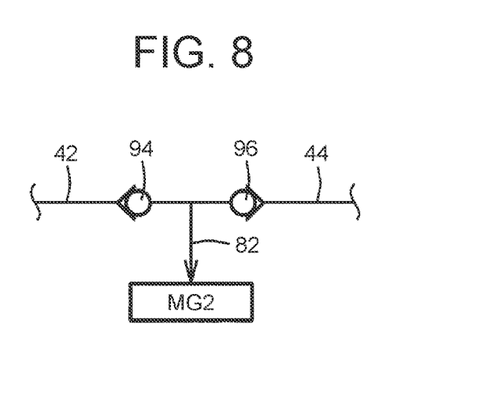
FIG. 8 is a view explaining a specific example of a switching mechanism provided to the lubricating apparatus of FIG. 7.
Figure 9:
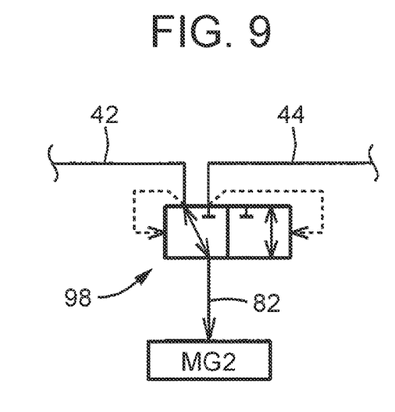
FIG. 9 is a view explaining another example of the switching mechanism provided to the lubricating apparatus of FIG. 7.

Compared with the lubricating apparatus 80 of FIG. 6, in a lubricating apparatus 90 of FIG. 7, a switching mechanism 92 is provided at a connected part between the MG2 oil supply passage 82 and the first and second supply passages 42, 44 so as to supply the lubricating oil in the passage on the high pressure side to the second motor generator MG2. The switching mechanism 92 may be configured by using a pair of check valves 94, 96 as shown in FIG. 8, for example, or may be configured by employing a spool-type shuttle valve 98 shown in FIG. 9. FIG. 9 shows a state in which the lubricating oil of the first supply passage 42 is supplied from the shuttle valve 98 via the MG2 oil supply passage 82 to the second motor generator MG2, during the traveling time when the engine 20 is stopped rotating, like in the EV travel mode; and the shuttle valve 98 is mechanically switched by the difference in pressure between the supply passages 42, 44 in such a manner that the lubricating oil of the second supply passage 44 is supplied to the second motor generator MG2 at the operating time of the engine 20. In the embodiment, compared to the lubricating apparatus 80 of FIG. 6, the lubricating oil on the high pressure side is prevented from leaking toward the supply passage 42 or the supply passage 44 that is on the low pressure side. In FIGS. 6, 7, when the lubricating oil is supplied from the second supply passage 44 during the operation of the engine 20, it is assumed that the pressure of the lubricating oil becomes higher on the second supply passage 44 side than that on the first supply passage 42 side, but the oil passage may be switched through electronic control by an electromagnetic switching valve.

Figure 10:
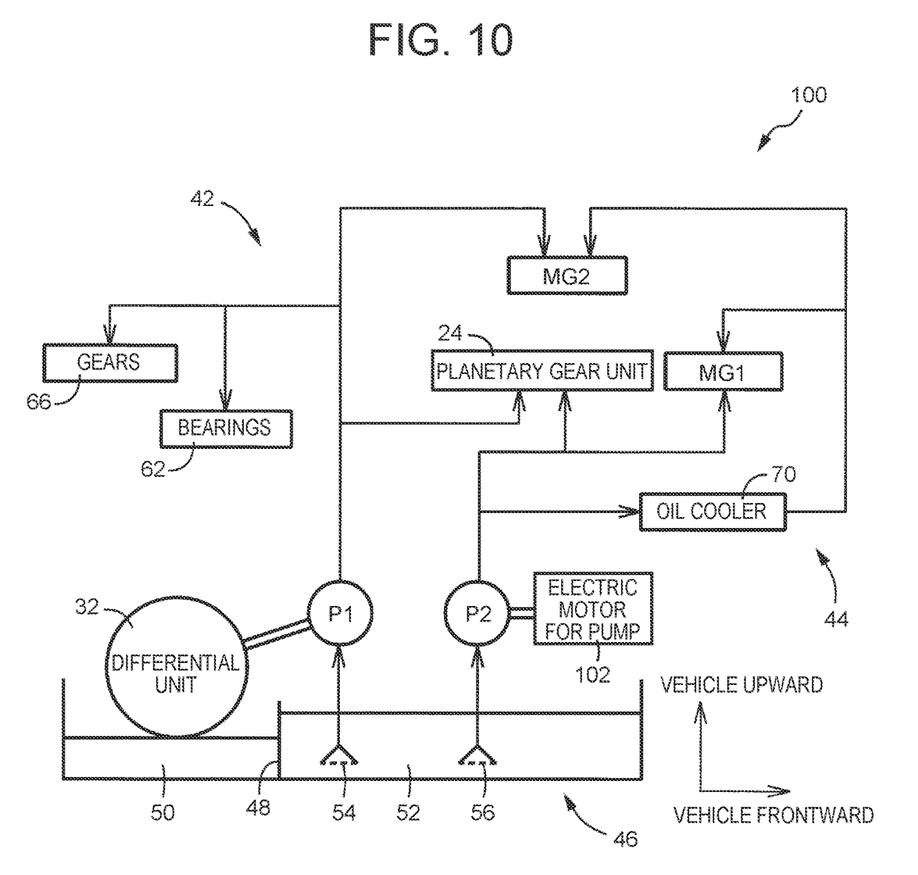
FIG. 10 is an oil-hydraulic circuit diagram explaining further another example of the lubricating apparatus preferably provided to the hybrid vehicle of FIG. 1.

In a lubricating apparatus 100 of FIG. 10, the second oil pump P2 is different, compared with the lubricating apparatus 40 of FIG. 5, and an electric oil pump having an electric motor for a pump 102 is used as a rotary driving source. The electric motor for a pump 102 can rotary-drive the second oil pump P2 at any time, with any rotary-drive force, and at any rotational speed; therefore, regardless of the operation condition of the engine 20, it is possible to properly supply a necessary amount of lubricating oil from the second supply passage 44 to the motor generators MG1, MG2, and the planetary gear unit 24 when necessary. As with each embodiment, it is also possible to bring the electric motor for a pump 102 to operate in accordance with the operation of the engine 20 so as to supply the lubricating oil. Also in the lubricating apparatuses 80, 90 of FIG. 6 and FIG. 7, the electric oil pump may be used as the second oil pump P2.

Figure 11:
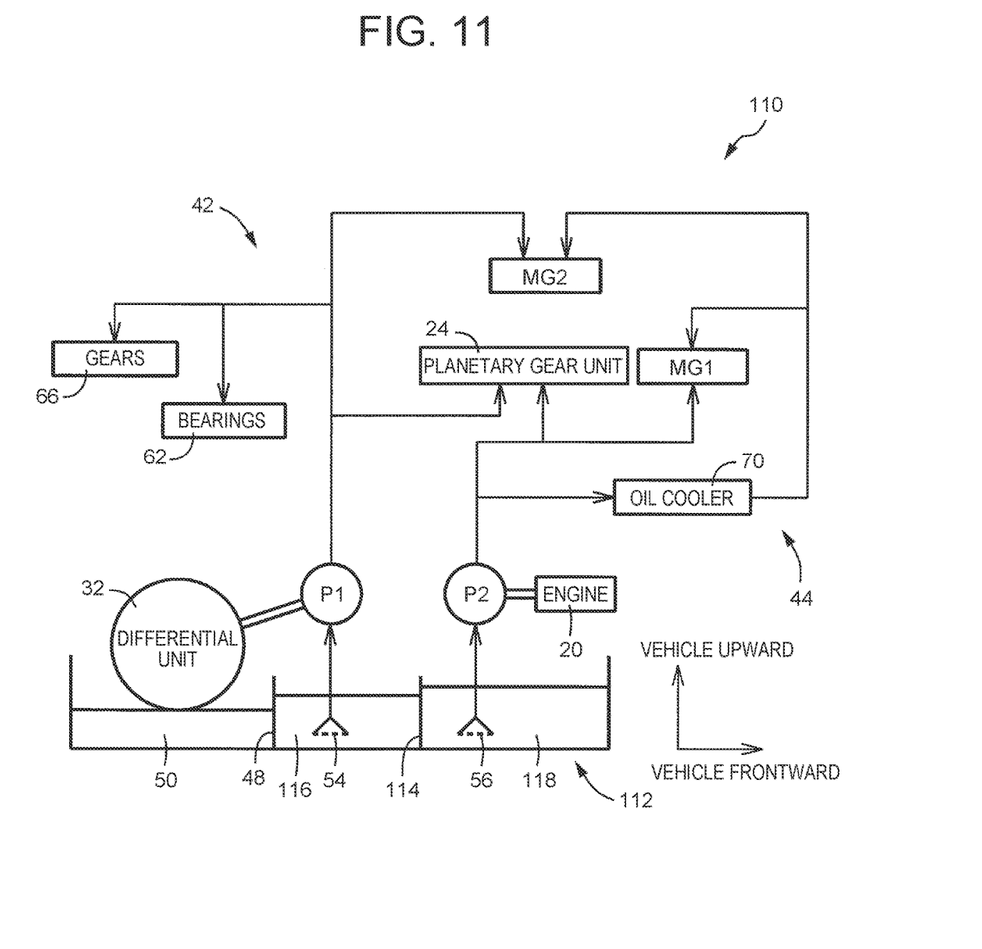
FIG. 11 is an oil-hydraulic circuit diagram explaining yet further another example of the lubricating apparatus preferably provided to the hybrid vehicle of FIG. 1.

In a lubricating apparatus 110 of FIG. 11, an oil reservoir 112 is different, compared with the lubricating apparatus 40 of FIG. 5. This oil reservoir 112 is provided with a partitioning wall 114 in addition to the partitioning wall 48 as the flow restricting part, so that the oil reservoir 112 is divided into three parts in the vehicle longitudinal direction. The intake port 54 of the first oil pump P1 is disposed in a second oil reservoir 116 at the center position, and the intake port 56 of the second oil pump P2 is disposed in the third oil reservoir 118 located at the front position. In the static state in which the operations of the oil pumps P1, P2 are both stopped and the fluctuations of the oil levels are stopped, the lubricating oil having been supplied to the respective components of the power transmission system 12 flows down to return to the oil reservoir 112, and the oil levels go up over the partitioning walls 48, 114, so that the oil levels of the oil reservoirs 50, 116, 118 become equal to each other. On the other hand, when the oil pumps P1, P2 are operated during the vehicle traveling or the like, the respective oil levels of the oil reservoirs 50, 116, 118 individually vary due to the flow restriction by the partitioning walls 48, 114 as shown in FIG. 11. That is, in the first oil reservoir 50, the oil level is preferentially lowered by the scoop-up of the lubricating oil by the differential ring gear Gd or the like, and the agitation of the lubricating oil by the differential ring gear Gd or the like is suppressed so as to reduce energy loss. On the other hand, the oil levels of the second oil reservoir 116 and the third oil reservoir 118 where the intake ports 54, 56 are respectively disposed are relatively higher, so that it is suppressed that the intake ports 54, 56 are exposed on the oil surfaces; thus they can properly suck the lubricating oil. The partitioning wall 114 may have the same height as that of the partitioning wall 48, or may have a different height from that of the partitioning wall 48. In the case in which the partitioning wall 114 has a higher height than that of the partitioning wall 48, when the lubricating oil is sucked only by the first oil pump P1 and the oil level becomes equal to or lower than the partitioning wall 114, thereafter, the lubricating oil of the first oil reservoir 50 and the lubricating oil of the second oil reservoir 116 are sucked so that the oil levels thereof become rapidly lowered to thereby rapidly reduce the energy loss due to the agitation of the lubricating oil by the differential ring gear Gd or the like.

In the present embodiment, the second oil reservoir 116 and the third oil reservoir 118 are separated from each other, so that the dimensions in the vehicle longitudinal direction of the second oil reservoir 116 and the third oil reservoir 118 are reduced. Therefore, deviation of the lubricating oil due to change in posture of the vehicle in accordance with a slope of the road surface or the like, or due to acceleration and deceleration or the like is suppressed, to thereby properly suppress that the intake ports 54, 56 are exposed on the oil surface. Since the intake ports 54, 56 are separately disposed in the oil reservoirs 116, 118; thus, compared with the case of disposing the intake ports 54, 56 in one of the oil reservoir 116 and the oil reservoir 118, the lubricating oil is sucked from both the oil reservoirs 116, 118; therefore, it is possible to secure a sufficient amount of lubricating oil, and also possible to separately adjust the intake amount (discharge amount) of each of the oil pumps P1, P2 depending on each amount of the return oil to the second oil reservoir 116 and to the third oil reservoir 118 so as to suppress the air sucking, for example. Also in the lubricating apparatuses 80, 90, 100, the oil reservoir 112 having such a configuration may be employed.

Figure 12:
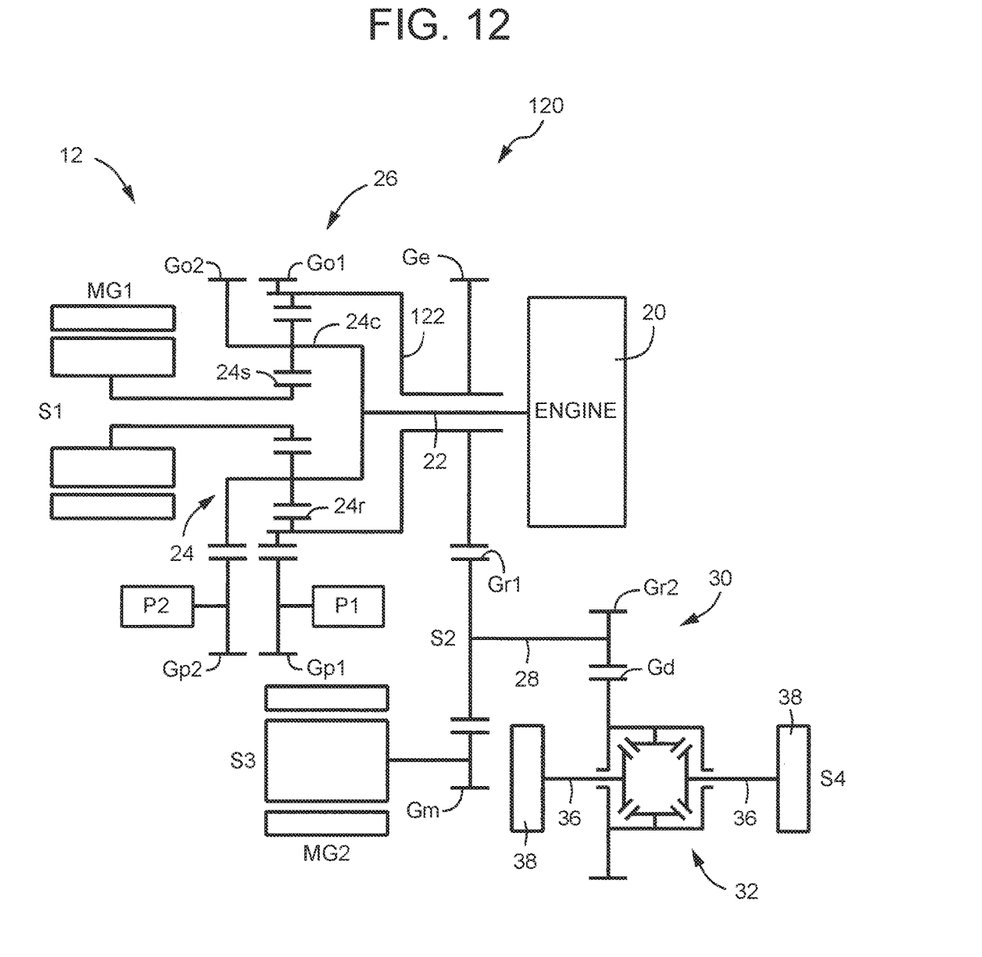
FIG. 12 is an outline view explaining a hybrid vehicle having a different manner of a mechanical connection of a pair of oil pumps, which corresponds to FIG. 1.

A hybrid vehicle 120 of FIG. 12 has a different structure to mechanically rotary-drive the oil pumps P1, P2, compared with the hybrid vehicle 10. Specifically, the first oil pump P1 is rotary driven by a branching gear Go1 integrally provided to the ring gear 24$r$ of the planetary gear unit 24 via a pump drive gear Gp1. The ring gear 24$r$ is integrally provided with the engine output gear Ge via a connecting member 122 so as to be mechanically connected to the differential unit 32 via the large reduction gear Gr1 or the like in such a manner as to transmit motive power. The second oil pump P2 is rotary-driven by a branching gear Go2 integrally provided to the carrier 24$c$ of the planetary gear unit 24 via a pump drive gear Gp2. The carrier 24$c$ is integrally connected to the input shaft 22, and is mechanically rotary-driven along with the rotation of the engine 20. Accordingly, also in the hybrid vehicle 120, it is possible to preferably provide the lubricating apparatus 40, 80, 90, or 110, and attain the same operational effect.

As aforementioned, the embodiments have been described with reference to the drawings, but they are merely examples of one embodiment and the present disclosure can be implemented in variously modified and improved manners based on the knowledge of those skilled in the art.

What is claimed is:
1. A hybrid vehicle comprising:
   an engine;
   a first rotary machine configured to drive the hybrid vehicle;
   a power transmission system configured to transmit drive force from the engine and the first rotary machine via an output unit to driven wheels;
   a first oil pump configured to be mechanically rotary-driven along with rotation of the output unit;
   a second oil pump configured to be rotary-driven by a rotary drive source that is different from the output unit;
   a first supply passage connected to a discharge side of the first oil pump, and the first supply passage configured to supply lubricating oil at least to the first rotary machine;
   a second supply passage connected to a discharge side of the second oil pump, and the second supply passage configured to supply lubricating oil at least to the first rotary machine; and
   an oil cooler provided to only the second supply passage of the first supply passage and the second supply passage.

2. The hybrid vehicle according to claim 1, wherein
the lubricating oil discharged from the second oil pump is supplied via the oil cooler to the first rotary machine.

3. The hybrid vehicle according to claim 1, wherein
the hybrid vehicle travels in an EV travel mode for the hybrid vehicle to travel by the first rotary machine in a state in which the engine is stopped, and in an HV travel mode for the engine to operate on a higher load side than a load in the EV travel mode, and
the second oil pump is an oil pump mechanically rotary-driven along with rotation of the engine.

4. The hybrid vehicle according to claim 1, wherein
the second oil pump is an oil pump rotary-driven by an electric motor.

5. The hybrid vehicle according to claim 1, wherein
the first supply passage and the second supply passage are configured independently of each other.

6. The hybrid vehicle according to claim 1, further comprising
a common passage having one end connected to the first supply passage and to the second supply passage, and the other end connected to the first rotary machine.

7. The hybrid vehicle according to claim 6, further comprising
a switching mechanism provided at the end of the common passage connected to the first supply passage and to the second supply passage.

8. The hybrid vehicle according to claim 6, further comprising
a switching mechanism provided at the end of the common passage connected to the first supply passage and to the second supply passage.

9. The hybrid vehicle according to claim 6, wherein
a discharge amount of the first oil pump and the second oil pump is defined such that when the hybrid vehicle travels in an HV travel mode and the first oil pump and the second oil pump are both rotary-driven, an oil pressure of the second supply passage connected to the discharge side of the second oil pump is higher than an oil pressure of the first supply passage, the HV travel mode being a mode in which the engine operates on a higher load side than a load in an EV travel mode.

10. The hybrid vehicle according to claim 1, wherein
the power transmission system includes:
a second rotary machine for differential control; and
a differential mechanism that includes a first rotary element connected to the engine, a second rotary element connected to the second rotary machine for differential control, and a third rotary element connected to the output unit, and
the second supply passage is configured to supply the lubricating oil having passed through the oil cooler to also the second rotary machine for differential control.

11. The hybrid vehicle according to claim 10, wherein
the first supply passage is configured to supply lubricating oil to also the differential mechanism.

* * * * *